US011507183B2

(12) United States Patent
Manjunath et al.

(10) Patent No.: US 11,507,183 B2
(45) Date of Patent: Nov. 22, 2022

(54) RESOLVING NATURAL LANGUAGE AMBIGUITIES WITH RESPECT TO A SIMULATED REALITY SETTING

(71) Applicant: Apple Inc., Cupertino, CA (US)

(72) Inventors: Niranjan Manjunath, San Jose, CA (US); Scott M. Andrus, Santa Clara, CA (US); Xinyuan Huang, San Jose, CA (US); William W. Luciw, Los Altos, CA (US); Jonathan H. Russell, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 17/022,680

(22) Filed: Sep. 16, 2020

(65) Prior Publication Data

US 2021/0089124 A1    Mar. 25, 2021

Related U.S. Application Data

(60) Provisional application No. 62/905,114, filed on Sep. 24, 2019.

(51) Int. Cl.
*G06F 3/01* (2006.01)
*G10L 15/22* (2006.01)
*G10L 15/26* (2006.01)

(52) U.S. Cl.
CPC .............. *G06F 3/013* (2013.01); *G06F 3/017* (2013.01); *G10L 15/22* (2013.01); *G10L 15/26* (2013.01); *G10L 2015/228* (2013.01)

(58) Field of Classification Search
None
See application file for complete search history.

(56) References Cited

U.S. PATENT DOCUMENTS

2014/0237366 A1* 8/2014 Poulos ................... G06F 3/013
715/728
2019/0221191 A1* 7/2019 Chhipa .................. G09G 3/002

FOREIGN PATENT DOCUMENTS

EP    2575128 A2 *  9/2011    ........... G10L 15/183
EP    2575128 A2     4/2013

OTHER PUBLICATIONS

International Preliminary Report on Patentability received for PCT Patent Application No. PCT/US2020/049284, dated Apr. 7, 2022, 10 pages.
(Continued)

*Primary Examiner* — Vu Nguyen
(74) *Attorney, Agent, or Firm* — Dentons US LLP

(57) ABSTRACT

The present disclosure relates to resolving natural language ambiguities with respect to a simulated reality setting. In an exemplary embodiment, a simulated reality setting having one or more virtual objects is displayed. A stream of gaze events is generated from the simulated reality setting and a stream of gaze data. A speech input is received within a time period and a domain is determined based on a text representation of the speech input. Based on the time period and a plurality of event times for the stream of gaze events, one or more gaze events are identified from the stream of gaze events. The identified one or more gaze events is used to determine a parameter value for an unresolved parameter of the domain. A set of tasks representing a user intent for the speech input is determined based on the parameter value and the set of tasks is performed.

60 Claims, 8 Drawing Sheets

(56) References Cited

OTHER PUBLICATIONS

International Search Report and Written Opinion received for PCT Patent Application No. PCT/US2020/049284, dated Nov. 5, 2020, 12 pages.

* cited by examiner

RESOLVING NATURAL LANGUAGE AMBIGUITIES WITH RESPECT TO A SIMULATED REALITY SETTING

CROSS-REFERENCE TO RELATED APPLICATIONS

This application claims the benefit of U.S. Provisional Application No. 62/905,114, filed Sep. 24, 2019, entitled "RESOLVING NATURAL LANGUAGE AMBIGUITIES WITH RESPECT TO A SIMULATED REALITY SETTING," the entire contents of which are hereby incorporated by reference.

FIELD

The present disclosure relates generally to natural language understanding, and more specifically to techniques for resolving natural language ambiguities with respect to a simulated reality setting.

BRIEF SUMMARY

The present disclosure describes techniques for resolving natural language ambiguities with respect to a simulated reality setting. In an exemplary technique, a simulated reality setting having one or more virtual objects is displayed on a display of an electronic system. Based on image data from one or more image sensors of the electronic system, a stream of gaze data is determined with respect to the simulated reality setting. Based on the displayed simulated reality setting and the determined stream of gaze data, a stream of gaze events is generated. The stream of gaze events corresponds to a plurality of event times and a plurality of gazed objects. The plurality of gazed objects includes the one or more virtual objects. A speech input is received within a time period and a domain is determined based on a text representation of the speech input. Based on the time period and the plurality of event times, one or more gaze events are identified from the stream of gaze events. The identified one or more gaze events correspond to an unresolved parameter of the domain. A parameter value is determined for the unresolved parameter based on the identified one or more gaze events. A set of tasks representing a user intent for the speech input is determined based on the determined parameter value. At least a portion of the set of tasks is performed, including displaying a second simulated reality setting on the display.

Identifying the one or more gaze events based on the time period and the plurality of event times and determining the set of tasks based on the parameter value determined based on the identified one or more gaze events can be desirable for improving the accuracy and reliability of a voice assistant operating on the electronic system. In particular, the identified one or more gaze events can be a relevant source of contextual information for accurately resolving the parameter of the domain. The accurately resolved parameter can then be used to determine the set of tasks that more likely corresponds to the user's intent for providing the speech input. As a result, user experience is enhanced, which corresponds to improved operability of the voice assistant operating on the electronic system.

DESCRIPTION

Figure 1A:
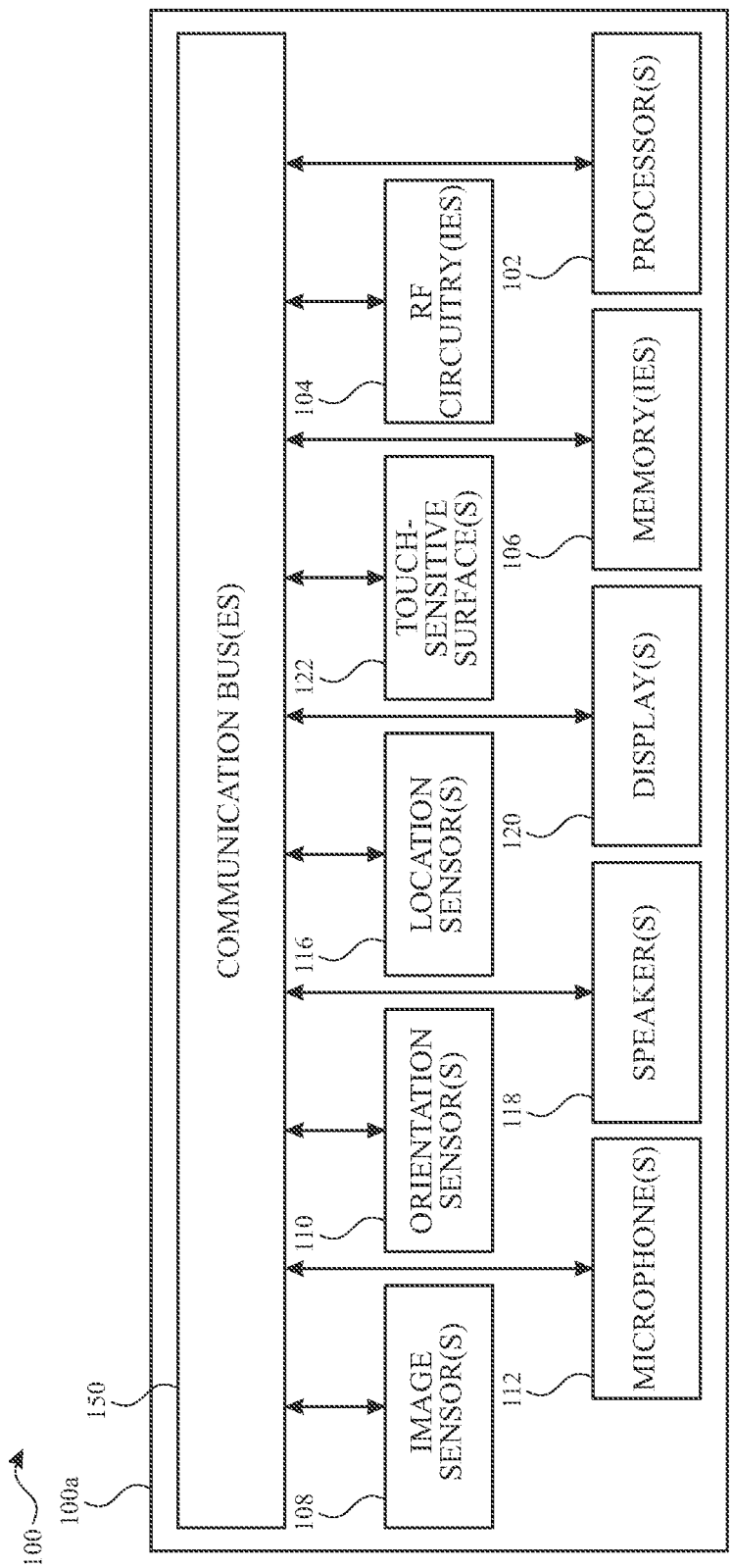
FIGS. 1A-1B depict exemplary systems for use in various computer simulated reality technologies, including virtual reality and mixed reality.

Various examples of electronic systems and techniques for using such systems in relation to various simulated reality technologies are described.

Voice assistants operating on an electronic system can useful for executing spoken requests from the user. In particular, a voice assistant can enable a user to interact with a simulated reality setting provided by the electronic system. For example, a user can invoke the voice assistant and provide a spoken request related to the simulated reality setting. The voice assistant can then interpret the spoken request to determine the one or more corresponding tasks the user wishes to be performed with respect to the simulated reality setting. However, due to the inherent nature of natural language spoken by a user, the voice assistant can encounter ambiguous expressions in the spoken request. For example, the voice assistant may have difficulties resolving a parameter of a natural language domain that is mapped to the ambiguous expression. This can present challenges for the voice assistant to efficiently and accurately determine the tasks corresponding to the provide spoken requests.

The present disclosure describes techniques for resolving natural language ambiguities with respect to a simulated reality setting. In accordance with some embodiments, a simulated reality setting having one or more virtual objects is displayed on a display of an electronic system. A speech input is received within a time period. The speech input includes, for example, a spoken request for a voice assistant operating on the electronic system to perform one or more tasks. A text representation of the speech input is analyzed using natural language understanding techniques to determine a natural language domain. The voice assistant may be unable to resolve a parameter of the domain as a result of an ambiguous expression in the speech input. Based on image data from one or more image sensors of the electronic system, a stream of gaze data is determined with respect to the simulated reality setting. Based on the displayed simulated reality setting and the determined stream of gaze data, a stream of gaze events is generated. The stream of gaze events corresponds to a plurality of event times and a plurality of gazed objects. The plurality of gazed objects includes the one or more virtual objects. The stream of gaze events can serve as a source of relevant contextual information for interpreting the ambiguous expression in the speech input. Based on the time period and the plurality of event times, one or more gaze events are identified from the stream of gaze events. In particular, the identified one or more gaze events is determined from the time period and the plurality of event times to be relevant to the unresolved parameter of the domain. A parameter value is determined for the unresolved parameter based on the identified one or more gaze events. A set of tasks representing a user intent for the speech input is determined based on the determined parameter value. At least a portion of the set of tasks is performed, including displaying a second simulated reality setting on the display. It should be appreciated that, by generating the stream of gaze events as a source of contextual information, one or more gaze events relevant to the unresolved parameter can be identified. The identified one or more gaze events can be used to more accurately resolve the parameter and determine the set of tasks that more accurately corresponds to the user's intent for providing the speech input. As a result, the user's experience with the voice assistant in the simulated reality setting is improved.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, an SR system may detect an individual walking a few paces forward and, responsive thereto, adjust graphics and audio presented to the individual in a manner similar to how such scenery and sounds would change in a physical setting. Modifications to attribute(s) of virtual object(s) in an SR setting also may be made responsive to representations of movement (e.g., audio instructions).

An individual may interact with and/or sense an SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). An MR setting refers to a simulated setting that is designed to integrate computer-created sensory inputs (e.g., virtual objects) with sensory inputs from the physical setting, or a representation thereof. On a reality spectrum, an MR setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationary with respect to a physical building.

One example of MR is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An AR setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of MR is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an AR forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Figure 1B:
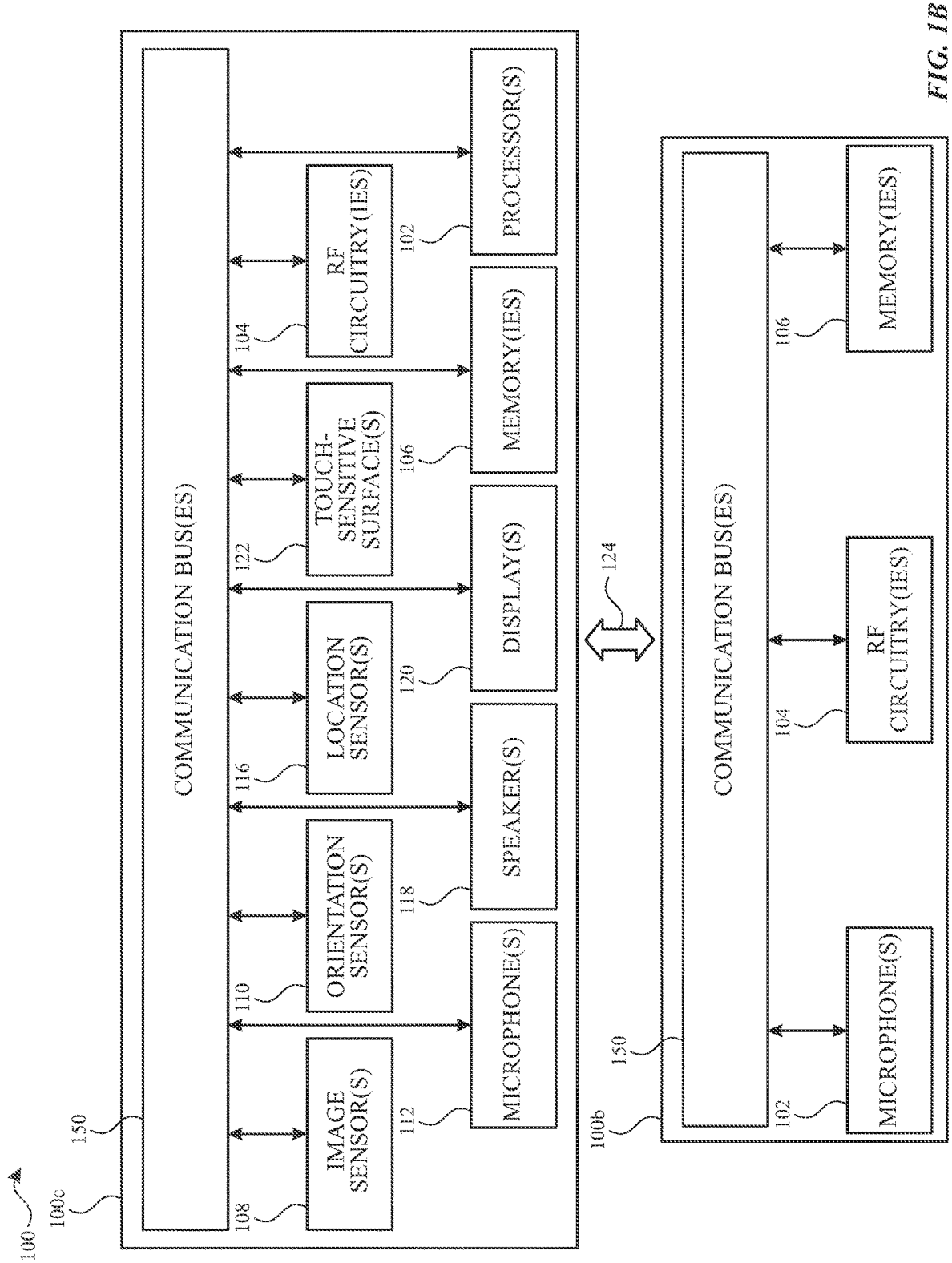

FIG. 1A and FIG. 1B depict exemplary system 100 for use in various simulated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of system 100 are implemented in a second device (e.g., a head-mounted device). In some examples, device 100a is implemented in a base station device or a second device.

As illustrated in FIG. 1B, in some examples, system 100 includes two (or more) devices in communication, such as through a wired connection or a wireless connection. For example, first device 100b is in communication with second device 100c via communication connection 124 (e.g., using RF circuitries 104). First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

Figure 2:
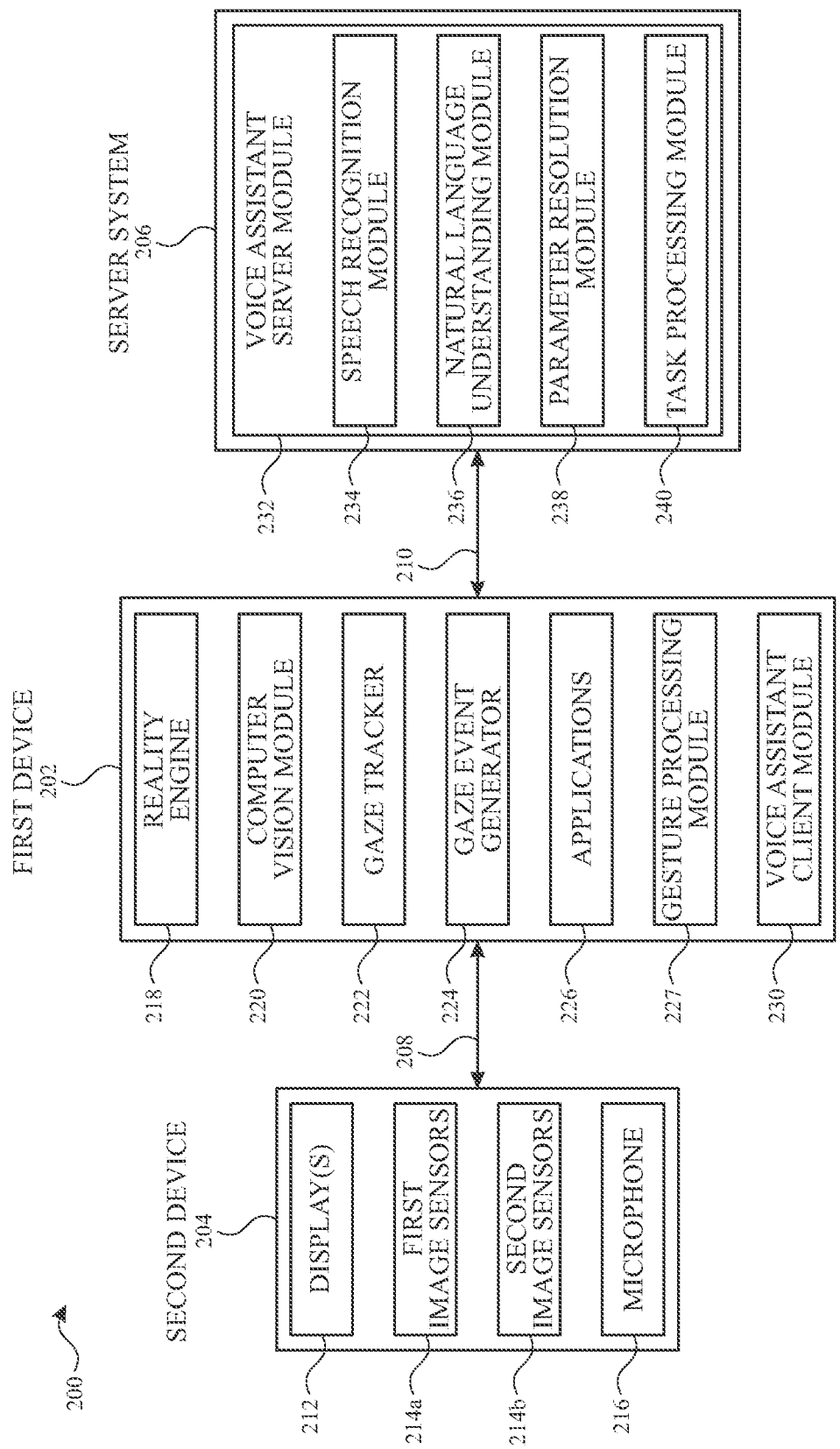
FIG. 2 depicts an exemplary system for resolving natural language ambiguities with respect to a simulated reality setting.

FIG. 2 depicts system 200 for resolving natural language ambiguities with respect to an SR setting, in accordance with some embodiments. As shown, system 200 includes first device 202, second device 204, and server system 206. First device 202 and second device 204 (e.g., similar or identical to devices 100b and 100c, respectively) form an SR system (e.g., similar or identical to system 100) that is configured to provide an SR experience to the user. Server system 206 includes one or more computer servers that are configured to support the processing and execution of voice commands received by first device 202 via second device 204. The various components (and sub-components) shown in FIG. 2 are implemented in hardware (e.g., one or more processors and memory), software instructions for execution by one or more processors, firmware, including one or more signal processing and/or application specific integrated circuits, or a combination thereof. Although for simplicity, second device 204 is depicted as including only image sensors 214a-b and microphone 216 (e.g., similar or identical to image sensor(s) 108 and microphone(s) 112, respectively), it should be recognized that second device 204 can include other sensors, including the various sensors of system 100 (FIGS. 1A and 1B).

Second device 204 is configured to provide user-facing, front-end SR functions. For example, second device 204 is configured to display an SR setting on display(s) 212 and receive input (e.g., via image sensors 214a-b and microphone 216) representing user interaction with the SR setting. First device 202 is communicatively coupled to second device 204 via communication connection 208 (e.g., similar or identical to connection 124) and is configured to provide back-end SR functions that support second device 204. For example, first device 202 is configured to generate (e.g., render) the SR setting for display on second device 204 and continuously update the SR setting in response to user input received via the various sensors of second device 204. In one embodiment, second device 204 is a head-mounted display and first device 202 is a base station device communicatively tethered to second device 204. Although in the present embodiment, the various SR functions are divided between the components of first device 202 and second device 204, it should be recognized that, in other embodiments, the various SR functions and components of first device 202 and second device 204 can be combined into a single user device (e.g., similar to device 100a). For example, system 200 can alternatively be implemented with the single user device in communication with server system 206.

During operation, display(s) 212 displays an SR setting (e.g., MR or VR setting) having one or more virtual objects. The SR setting is generated by reality engine 218 of first device 202. For example, based on various sensor data (e.g., image, location, and orientation data) obtained from the sensors of second device 204 (e.g., via communication connection 208), reality engine 218 renders the SR setting for display on display(s) 212. Image sensors 214a-b include one or more first image sensors 214a that are directed toward the user (e.g., for gaze tracking) and one or more second image sensors that are directed away from the user (e.g., for capturing image data of the physical setting). Reality engine 218 renders the SR setting, for example, based on gaze data derived from image data (e.g., image data of the user's eyes) received via one or more first image sensors 214a of second device 204. In embodiments where the SR setting is an MR setting, reality engine 218 obtains, from one or more second image sensors 214b of second device 204, image data representing a physical setting within the user's field of view. In these embodiments, reality engine 218 renders the one or more virtual objects such that they appear superimposed over the physical setting or a representation thereof. In embodiments where display(s) 212 is an opaque display(s), the MR setting generated by reality engine 218 includes the representation of the physical setting.

Figure 3A:
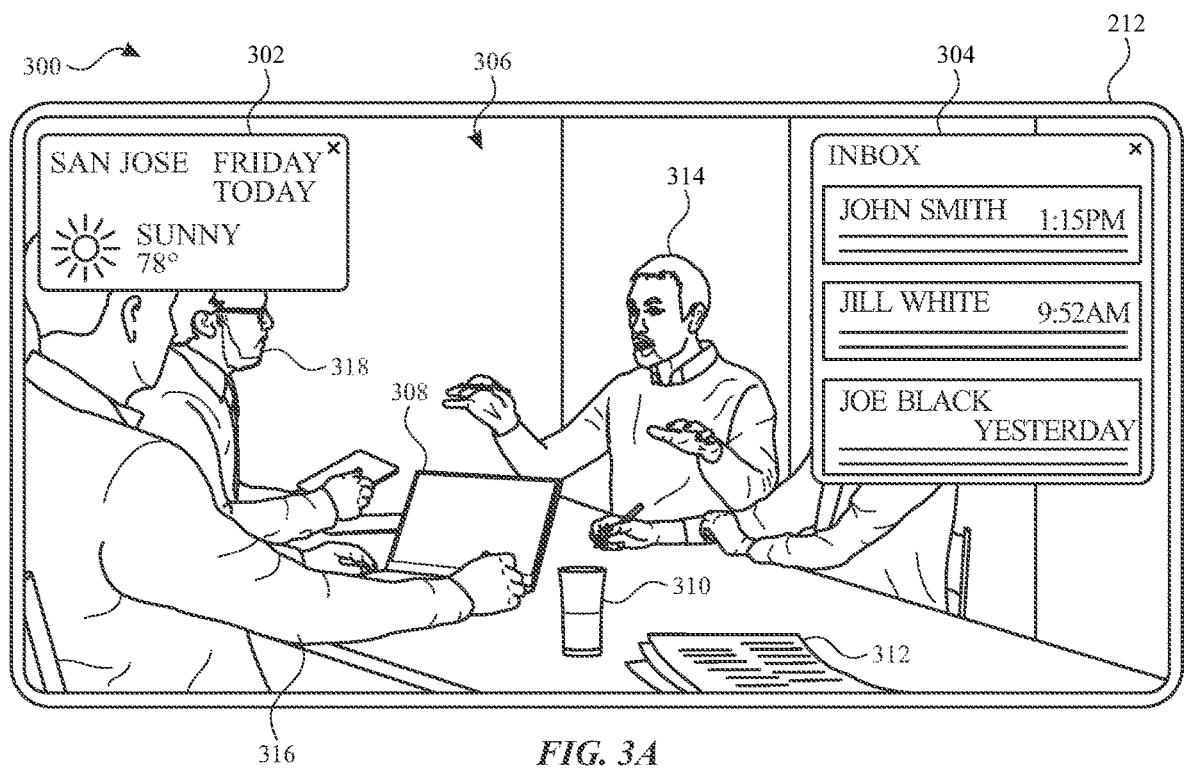
FIGS. 3A-3C depicts exemplary simulated reality settings displayed on an electronic system.
Figure 3B:
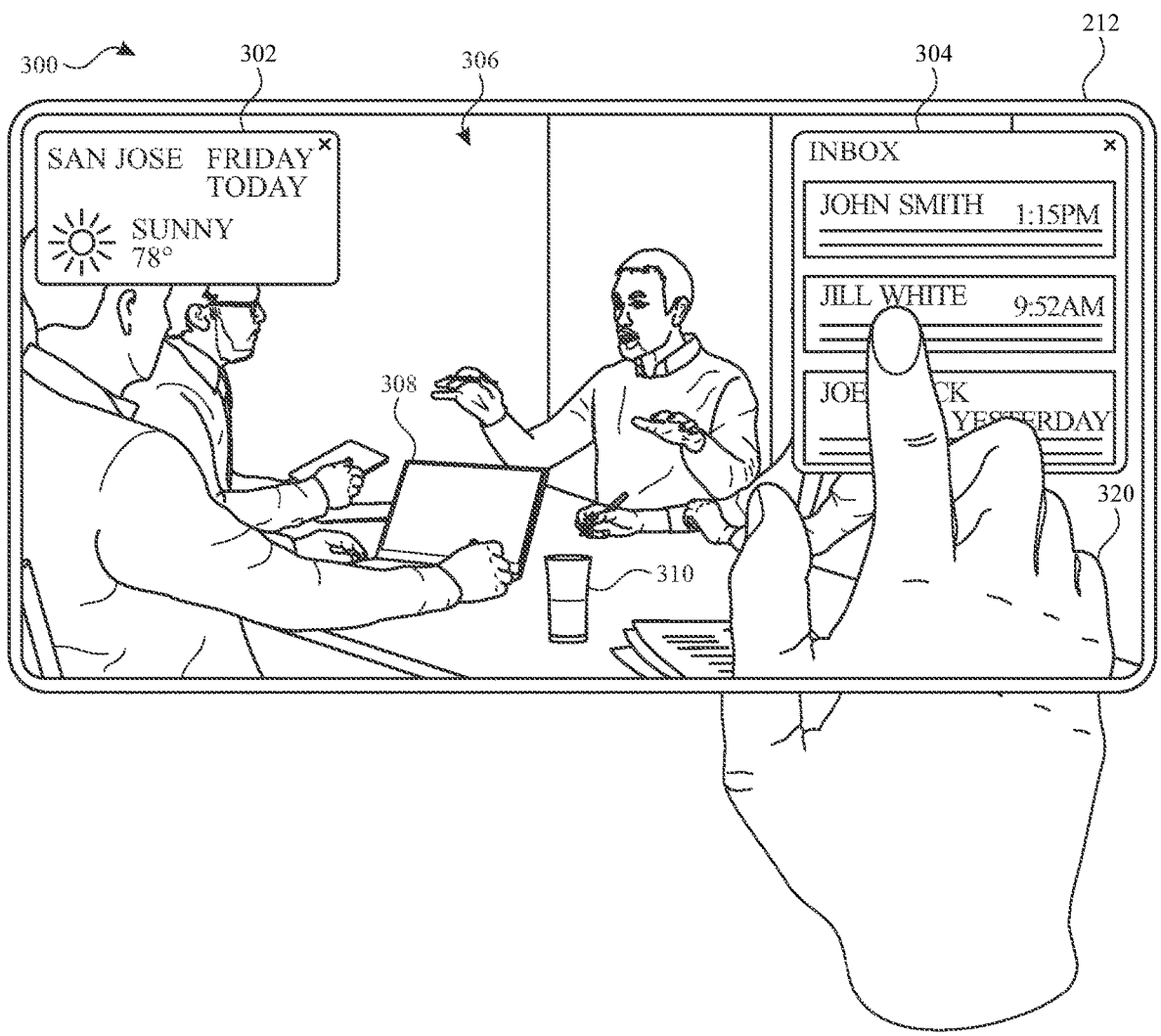
Figure 3C:
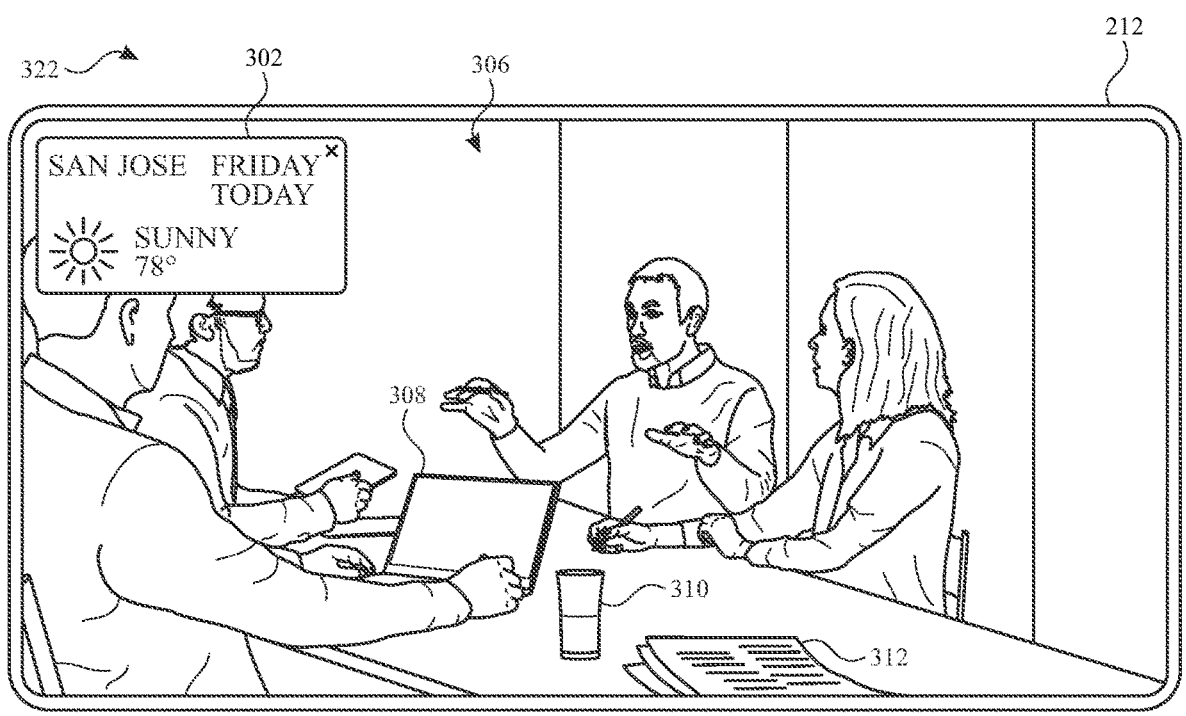

FIGS. 3A-3C depict exemplary simulated reality settings displayed on display(s) 212, in accordance with some embodiments. FIGS. 3A-3C are described below to illustrate exemplary systems and techniques for resolving natural language ambiguities with respect to a simulated reality setting. With reference to FIG. 3A, SR setting 300 is an exemplary SR setting that is generated by reality engine 218 and displayed on display(s) 212, in accordance with some embodiments. In this example, SR setting 300 is an AR setting having virtual objects 302 and 304 that are superimposed over a view of physical setting 306. Physical setting 306 includes a conference room with several physical objects 308-318, including attendees, a laptop, a cup, and a document. Virtual objects 302 and 304 are graphical user interfaces of applications 226 running on first device 202. In particular, virtual object 302 is the graphical user interface for a weather application and virtual object 304 is the graphical user interface for an email application. It should be appreciated that, in examples where display(s) 212 is an opaque display, the SR setting can include a representation of physical setting 306 (e.g., video pass-through) that is generated from image data obtained from one or more second image sensors 214b. Moreover, in examples where the SR setting is a VR setting, a physical setting (or a representation thereof) may not be included in the SR setting.

In some embodiments, reality engine 218 is configured to track the objects (e.g., virtual and physical objects) in SR setting 300. For example, reality engine 218 maintains a log of the virtual and physical objects that are in the user's field of view at any given point of time. Each object in SR setting 300 is, for example, assigned a unique object identifier to log and track the objects in the user's field of view. In some embodiments, reality engine 218 determines attribute tags for each object in SR setting 300. Attribute tags specifying various attributes of the respective objects are stored in association with the respective object identifiers. The attribute tags specify, for example, keywords that are semantically related to a respective object, the position at which the respective object is displayed in SR setting 300, and/or the manner in which the respective object can be manipulated.

By way of example, reality engine 218 can assign the object identifier "WeatherAppU101" to virtual object 302 and store corresponding attribute tags in associated with the object identifier. The attribute tags specify, for example, keywords that are semantically related to virtual object 302 (e.g., "graphical user interface," "weather," and "application"), the coordinates of its position in SR setting 300, and keywords that represent how virtual object 302 can be manipulated (e.g., "close," "resize," "location," and "time"). In some embodiments, reality engine 218 includes a library of predefined virtual objects. The library includes, for example, object identifiers, attributes, and keywords associated with each predefined virtual object. In these embodiments, the attribute tags for displayed virtual objects are determined by searching and retrieving from the library, associated keywords and attributes for the virtual objects.

For physical objects in SR setting 300, image data of physical setting 306 is obtained from one or more second image sensors 214b to identify the physical objects and determine corresponding attribute tags for the physical objects. For example, computer vision module 220 obtains image data of physical setting 306 from one or more second image sensors 214b (via connection 208) and performs pattern recognition to identify physical objects 308-318. As discussed above, the corresponding attribute tags are stored in association with unique physical object identifiers that are assigned by reality engine 218 to each of physical objects 308-318. The attribute tags specify, for example, the classification (e.g., human, laptop, cup, document, etc.) of the respective physical object as determined by computer vision module 220 using pattern recognition. In addition, the attribute tags can include other attributes (e.g., semantically related keywords, associated actions, etc.) of the respective physical objects. By way of example, reality engine 218 assigns physical object 308 the object identifier "physicalobject01" and stores attribute tags specifying the classification of physical object 308 (e.g., "laptop") as determined by computer vision module 220, the coordinates representing the position of physical object 308 in SR setting 300, keywords (e.g., "computer," "device," "electronic," etc.) that are semantically related to physical object 308, and associate actions (e.g., internet search) that can be performed with respect to physical object 308).

Gaze tracker 222 obtains image data from one or more first image sensors 214a (via connection 208) and determines, from the image data, a stream of gaze data over time with respect to the SR setting. The image data includes, for example, images of the user's eyes over time. The stream of gaze data includes various information, such as gaze direction and gaze fixation position, representing where the user is gazing with respect to SR setting at any given time. For example, based on obtained images of the user's eyes, gaze tracker 222 determines the user's gaze direction and determines coordinates representing the points in SR setting 300 where the user is fixing their gaze at any given time.

Based on SR setting 300 displayed on display(s) 212 and the determined stream of gaze data, gaze event generator 224 generates a stream of gaze events corresponding to respective event times and respective gazed objects in SR setting 300. The gazed objects include virtual and/or physical objects in SR setting 300 and/or physical setting 306. For example, gaze event generator 224 analyzes the stream of gaze data with respect to SR setting 300 and determines which object (e.g., virtual or physical object) in SR setting 300 the user's gaze is fixated on at any given time. Thus, each gaze event in the stream of gaze events occurs at a respective event time and represents a user's gaze fixation on a respective gazed object.

In some embodiments, the stream of gaze events are stored in the memory (e.g., memory 106) of first device 202. For example, the stream of gaze events are stored in a circular buffer. In this example, the oldest gaze events are overwritten by the most recent gaze events. This can be desirable to limit the amount of personal information that is stored on first device 202. In some embodiments, each gaze event is assigned a unique gaze event identifier and information associated with the gaze event is stored in associated with the gaze event identifier. The stored information for a gaze event includes, for example, the identifier of the gazed object, the time at which the user begins to fixate their gaze on the gazed object, the time at which the user stops fixating their gaze on the gazed object, the duration of time at which the user continuously fixates their gaze on the gazed object, or any combination thereof. In some examples, the gazed objects corresponding to the stream of gazed events are a subset of all the objects in SR setting 300 and physical setting 306. For example, the stream of gaze events represents user gaze fixations on fewer than all the objects in SR setting 300 and physical setting 306.

In some embodiments, gaze event generator 224 identifies and stores only gaze events that satisfy a gaze duration threshold condition. For example, gaze event generator 224 determines from the stream of gaze data whether a user's gaze continuously fixates on a particular object in SR setting 300 or physical setting 306 for a duration of time that is greater than or equal to a threshold duration (e.g., 1, 3, or 5 seconds). If the user's gaze fixation on the object is greater than or equal to the threshold duration, then gaze event generator 224 generates a gaze event representing the user's gaze fixation on the gazed object and stores the gaze event as one of a sequence of gaze events in the stream of gaze events.

In some embodiments, while SR setting 300 is displaying on display(s) 212, microphone 216 of second device received speech input over a period of time. The speech includes, for example, a spoken request to perform a set of tasks related to the SR setting 300. In some examples, the speech input includes an ambiguous expression, such as a deictic expression. For example, the speech input is "Close this," where "this" is an ambiguous expression because it may be unclear which object the user is referring to in the SR or physical setting. In another example, the speech input is "What model of laptop is that," where "that laptop" is an ambiguous expression because it may be unclear which laptop the user is referring to in the SR or physical setting.

Voice assistant client module 230 receives the speech input (e.g., in the form of a stream of audio data) from second device 204 via connection 208 and provides the speech input to voice assistant server module 232 of server system 206 via connection 210 for further processing. Connection 210 is, for example, a wireless and/or wired communication connection (e.g., network connection) that is established between the RF circuitry (e.g., RF circuitry 104) of first device 202 and the network communication interface of server system 206. Voice assistant client module 230 is configured to provide user-facing, front end functions of a voice assistant whereas voice assistant server module 232 is configured to provide back end functions of the voice assistant. Although in the present embodiment, the functions of the voice assistant are divided between the components of first device 202 and server system 206, it should be recognized that, in other embodiments, the functions can be implemented on a single user device. For example, the components of voice assistant server module 232 can instead be implemented locally on first device 202.

In the present embodiment, voice assistant server module 232 receives the speech input from voice assistant client module 230 via connection 210. Receiving the speech input causes voice assistant server module 232 to perform speech-to-text conversion using speech recognition module 234. For example, speech recognition module 234 extracts features from the speech input and determines, using acoustic and language models, a text representation that most likely corresponds to the speech input. The text representation is, for example, a token sequence representing a sequence of words.

Natural language understanding module 236 receives the text representation from speech recognition module 234 and performs natural language processing on the text representation to determine a domain (e.g., natural language domain or domain of an ontology) that corresponds to the text representation. For example, natural language understanding module 236 includes an ontology and the domain is determined using the ontology.

The ontology is, for example, a data structure having a hierarchy of nodes. Each node in the ontology represents a respective domain of a plurality of domains. Each domain of the ontology corresponds to a category of concepts and represents semantically related tasks that the voice assistant is capable of performing. By way of example, the ontology includes a "search" domain that corresponds to concepts related to performing a search (e.g., Internet search) and represents the task of performing a search query. By way of another example, the ontology includes an "applications" domain that corresponds to concepts related to the applications running on first device 202 and represents various tasks associated with the applications. In some examples, the "applications" domain can include various sub-domains corresponding to sub-concepts within the "application" domain. For example, the "application" domain can include a "close application" sub-domain representing the task of closing a currently-displayed graphical user interface of an application running on first device 202.

Natural language understanding module 236 parses the words and phrases in the text representation and determines which domain of the plurality of domains is most semantically related to the words and phrases of the text representation. The most semantically related domain is thus selected as corresponding to the text representation. In the example where the speech input is "Close it," natural language understanding module 236 can determine based on the word "close" that the text representation of the speech input is most semantically related to the "close application" sub-domain. Thus, in this example, the "close application" sub-domain is selected. In the example where the speech input is "What model of laptop is that," natural language understanding module 236 can determine based on the words (e.g., "what") that the text representation of the speech input is most semantically related to the "search" domain.

Each domain (or sub-domain) includes one or more associated parameters that represent one or more attributes of the respective concept. For example, the "search" domain includes a "search object(s)" parameter representing one or more objects (e.g., the image file, text string, or audio file) that forms the basis of the search query. Similarly, the "close application" sub-domain includes an "object" parameter representing the graphical user interface object to close.

Parameter resolution module 238 is configured to resolve the one or more parameters of the domain selected by natural language understanding module 236. In some embodiments, parameter resolution module 238 utilizes the semantic parsing information of the text representation performed by natural language understanding module 236 to attempt to resolve the one or more parameters of the selected domain. For example, based on semantic interpretations of the words and phrases in the text representation, parameter resolution module 238 maps one or more words or phrases in the text representation to one or more respective parameters of the selected domain.

In some embodiments, parameter resolution module 238 further uses contextual information of first device 202 and/or second device 204 to resolve the one or more parameters of the selected domain. In some embodiments, the contextual information obtained by parameter resolution module 238 includes contextual information of the objects in SR setting 300 and/or physical setting 306. For example, parameter resolution module 238 obtains from reality engine 218 the attribute tags of the virtual and physical objects identified in SR setting 300 and physical setting 306 and determines from the attribute tags whether any of the objects are semantically related (e.g., semantic matching score satisfies a threshold condition) to the determined domain or the one or more parameters of the determine domain. If an object in SR setting 300 or physical setting 306 is determined to be semantically related to the determined domain of the one or more parameters of the determined domain, the object can be used to resolve the one or more parameters. In some embodiments, analyzing the contextual information of the objects in SR setting 300 to resolve the one or more parameters of the selected domain is performed at first device 202 by voice assistant client module 230. For example, voice assistant client module 230 can implement some of the functions of parameter resolution module 238 and utilize the contextual information of the objects in SR setting 300 and/or physical setting 306 to resolve the one or more parameters of the selected domain. In this way, the contextual information of the objects remains on first device 202, which can be desirable to preserve the privacy of the user.

In an illustrative example where the speech input is "Close the weather app," natural language understanding module 236 determines that the domain corresponding to the text representation of this speech input is the "close application" sub-domain. In this example, parameter resolution module 238 determines from the text representation of the speech input that the phrase "weather app" in the speech input corresponds to the "object" parameter of the "close application" sub-domain. Further, parameter resolution module 238 analyzes the attribute tags of the objects (e.g., virtual objects 302-304 and physical objects 308-318) in SR setting 300 and/or physical setting 306 and determines whether any of the objects are semantically related (e.g., semantic matching score satisfies a threshold condition) to the phrase "weather app." In this example, parameter resolution module 238 determines that only virtual object 302 in SR setting 300 is semantically related to the phrase "weather app." The determination is based on the attribute tags of virtual object 302 specifying keywords (e.g., "weather" and "application") that are semantically related to the phrase "weather app." In this example, based on the text representation of the speech input and contextual information of SR setting 300, parameter resolution module 238 is able to resolve the "object" parameter of the "close application" sub-domain as corresponding to virtual object 302.

In another illustrative example where the speech input is "What model of laptop is that," natural language understanding module 236 determines that the domain corresponding to the text representation of this speech input is the "search" domain. In this example, parameter resolution module 238 determines from the text representation of the speech input that the words "model," "laptop," and "that" correspond to the "search object" parameter. In some cases, based on SR setting 300 displayed on display(s) 212, parameter resolution module 238 infers that the word "that" in the speech input is an ambiguous expression (e.g., deictic expression) referencing an object in SR setting 300. To resolve this ambiguity, parameter resolution module 238 analyzes the attribute tags of the objects (e.g., virtual objects 302-304 and physical objects 308-318) in SR setting 300 and physical setting 306 and determines whether any of the objects are semantically related to the words "model" or "laptop." In this example, parameter resolution module 238 determines that only physical object 308 in SR setting 300 is semantically related to the words "model" "laptop." Based on this determination, parameter resolution module 238 is able to fully resolve the "search object(s)" parameter of the "search" domain. In particular, the parameter resolution module 238 determines that the word "that" in the speech input is referring to physical object 308 and thus the "search object(s)" parameter is resolved as including an image of physical object 308 and the text search strings "model" and "laptop."

In some cases, parameter resolution module 238 may be unable to resolve at least one parameter of the selected domain using only the text representation of the speech input and information obtained from reality engine 218 regarding the objects in SR setting 300 and/or physical setting 306 (e.g., attribute tags of the objects). For instance, returning to the example where the speech input is "close it" and the corresponding domain is the "close application" sub-domain, parameter resolution module 238 may be unable to resolve the "object" parameter of the "close application" sub-domain based on the text representation of the speech input and information obtained from reality engine 218 regarding the objects in SR setting 300 (e.g., attribute tags of the objects). In particular, although parameter resolution module 238 is able to determine that the word "it" in the speech input is semantically relevant to the "object" parameter, parameter resolution module 238 is unable to determine which specific object the user is referring (e.g., which graphical user interface object to close) due to the ambiguous nature of the word "it." Moreover, upon analyzing the attribute tags of the objects in SR setting 300 and physical setting 306, parameter resolution module 238 identifies more than one object in SR setting 300 that can correspond to the "object" parameter of the "close application" sub-domain. For example, based on the keywords "graphical user interface," "application," and "close" specified in the attribute tags of virtual objects 302 and 304, parameter resolution module 238 determines that virtual objects 302 and 304 are both semantically related to the "close application" sub-domain and can each potentially correspond to the "object" parameter of the "close application" sub-domain. Thus, in this example, parameter resolution module 238 is unable to fully resolve the "object" parameter of the "close application" sub-domain to one specific object in SR setting 300 using only the text representation of the speech input and the attribute tags of the objects in SR setting 300.

In some embodiments, parameter resolution module 238 obtains additional contextual information from first device 202 to resolve a parameter that cannot not be resolved using only the text representation of the speech input and the attribute tags of the objects in SR setting 300. For example, in response to determining that the "object" parameter of the "close application" sub-domain cannot initially be resolved, parameter resolution module 238 accesses user gaze information to attempt to resolve the "object" parameter and determines which one of virtual objects 302 and 304 corresponds to the unresolved "object" parameter. In some embodiments, parameter resolution module 238 is configured to search the stream of gaze events generated by gaze event generator 224 (e.g., the gaze events stored in the circular buffer of first device 202) and identify one or more gaze events that correspond to the unresolved "object" parameter. The stream of gaze events can be obtained from first device 202 by server system 206 to perform the search. Alternatively, the search can be initiated by voice assistant client module 230 on first device 202. In some embodiments, parameter resolution module 238 applies one or more criteria to identify the one or more gaze events in the stream of gaze events that are relevant for resolving the "object" parameter. As described in greater detail below with reference to FIG. 4, the one or more criteria can be based on time correlation of the gaze events to the speech input.

Figure 4:
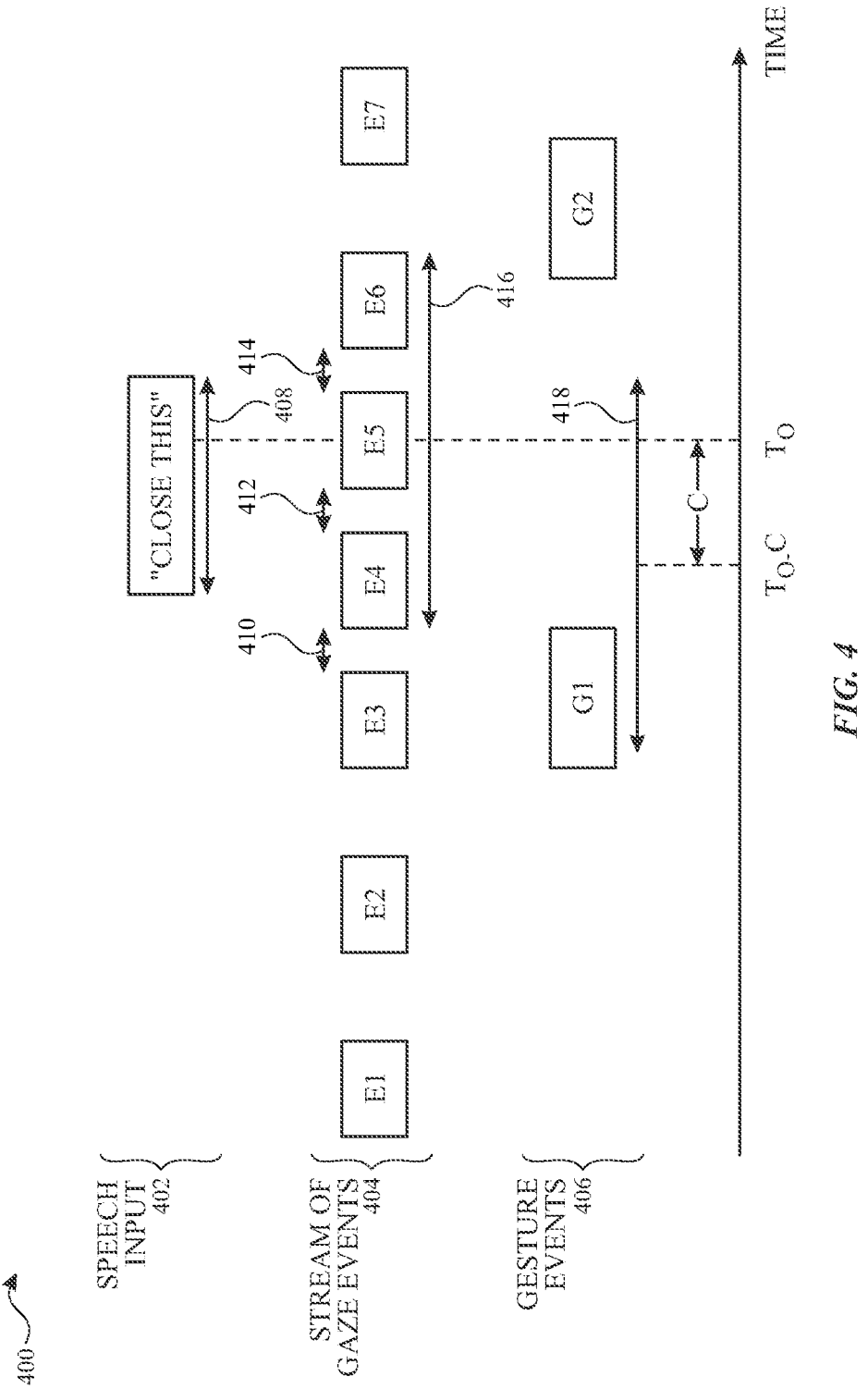
FIG. 4 depicts an exemplary timeline of gaze events and gesture events relative to a speech input.

FIG. 4 depicts timeline 400 of gaze events 404 and gesture events 406 relative to speech input 402, in accordance with some embodiments. As shown, stream of gaze events 404 includes a sequence of gaze events E1-E7 that occur at respective times along timeline 400. Speech input 403 ("close this") is received across time period 408. In this example, parameter resolution module 238 identifies one or more gaze events in stream of gaze events 404 that are time aligned with time period 408. For example, parameter resolution module 238 determines that gaze events E4 and E5 occur at event times that coincide with time period 408. Based on this determination, gaze events E4 and E5 are identified as being relevant contextual information for resolving the "object" parameter.

In some embodiments, identifying the one or more relevant gaze events includes identifying a cohesive set of gaze events in stream of gaze events 404 where the time intervals separating consecutive gaze events in the cohesive set of gaze events each satisfy a threshold condition. For example, parameter resolution module 238 determines that time intervals 410, 412, and 414 separating consecutive gaze events in gaze events E3-E6 are each less than or equal to a predetermined threshold time interval. Based on this determination, parameter resolution module 238 identifies gaze events E3-E6 as being a cohesive set of gaze events that coincide with time period 408 of speech input 402. Accordingly, in this example, gaze events E3-E6 are identified as being relevant contextual information for resolving the "object" parameter.

In some embodiments, the one or more relevant gaze events are identified based on its temporal proximity to time period 408 of speech input 402. For example, gaze events that at least partially overlap with time period 408 and/or that occur within a threshold time interval before or after time period 408 can be identified as relevant contextual information for resolving the "object" parameter.

In some embodiments, the one or more relevant gaze events are identified based on a reference time at which an ambiguous expression corresponding to the "object" parameter was spoken. For example, as shown in FIG. 4, the ambiguous word "this" in speech input 402 was spoken at time $T_0$. In some examples, time $T_0$ is determined by speech recognition module 234. In the present example, parameter resolution module 236 can set the reference time at time $T_0$. It should be recognize that, in other examples, the reference time can be set at a time different from time $T_0$ by applying a predefined offset to time $T_0$. Parameter resolution module 236 defines time period 416 based on the reference time (e.g., using one or more predefined rules). For example, time period 416 is defined as beginning at a predefined time interval before the reference time and ending at the predefined time interval after the reference time. In this example, parameter resolution module 238 identifies the one or more relevant gaze events based on time period 416. In particular, parameter resolution module 238 determines that gaze events E4, E5, and E6 occur within time period 416 and thus infers that these gaze events contain relevant contextual information for resolving the "object" parameter.

In some embodiments, the one or more relevant gaze events are identified based on the duration of gaze fixation associated with each gaze event. For instance, only gaze events in which the user's gazes were fixated on the respective gazed objects for greater than a threshold duration are identified as being relevant contextual information for resolving the "object" parameter. By way of example, if gaze event E4 has a gaze fixation duration that is less than the threshold duration, then gaze event E4 is not identified as relevant contextual information for resolving the "object" parameter.

In some embodiments, the one or more relevant gaze events are determined using a machine-learned model. The machine-learned model is implemented, for example, in gaze event generator 224 or in parameter resolution module 238. The machine-learned model is configured to receive the text representation of speech input 402 and stream of gaze events 404 (e.g., including the respective event times and gazed objects) as an input and to output a probability distribution across stream of gaze events 404. For example, the machine-learned model determines, for each gaze event E1-E7, the likelihood that the gaze event is relevant for resolving the "object" parameter. Based on the probability distribution, one or more relevant gaze events are selected from stream of gaze events 404. For example, the top N gaze events having the highest likelihood scores can be selected as relevant contextual information for resolving the "object" parameter, where N is a predefined positive integer.

It should be recognized that the one or more relevant gaze events can be identified by applying any combination of criteria described above. For example, gaze event(s) determined to satisfy an implemented combination of criteria are identified as relevant contextual information for resolving the unresolved parameter whereas gaze event(s) determined not to satisfy the implemented combination of criteria are not identified as relevant contextual information for resolving the unresolved parameter.

Using the identified one or more relevant gaze events, parameter resolution module 238 can fully resolve the unresolved "object" parameter. As described above, based on the text representation and the attribute tags of the objects in SR setting 300, parameter resolution module 238 is only able to resolve the "object" parameter down to two possible values: virtual object 302 or virtual object 304. In the present example, if gaze events E4 and E5 are identified from stream of gaze events 404 as being relevant contextual information for resolving the "object" parameter (e.g., by applying one or more of the criteria described above), then gaze events E4 and E5 are used to select between virtual objects 302 and 304 to fully resolve the "object" parameter. By way of example, if gaze event E4 corresponds to the user's gaze fixation on physical object 314 and gaze event E5 corresponds to the user's gaze fixation on virtual object 304, then one of virtual objects 302 and 304 is selected by comparing gaze events E4 and E5 to the respective gazed objects of gaze events E4 and E5. In particular, parameter resolution module 238 determines that virtual object 304 corresponds to the gazed object of E5 whereas virtual object 302 does not correspond to any of gazed objects of E4 and E5. Based on this determination, parameter resolution module 238 resolves the "object" parameter as corresponding to virtual object 304. For example, parameter resolution module 238 resolves the "object" parameter by including the object identifier of virtual object 304 as the parameter value for the "object" parameter.

In some embodiments, parameter resolution module 236 utilizes gesture events as an additional source of contextual information to resolve an unresolved parameter of the selected domain. As shown in FIG. 2, first device 202 further includes gesture processing module 227 that is configured to process (e.g., in conjunction with computer vision module 220) image data from second image sensors 214b to detect a gesture event corresponding to a user's gesture input. By way of example, in FIG. 3B, the user provides gesture input 320 to interact with SR setting 300 and/or physical setting 306. Gesture input 320 is captures as image data by second image sensors 214b and the image data is processed by computer vision module 220 and gesture processing module 227 to identify a corresponding gesture event. In particular, gesture processing module 227 is configured to determine, based on the image data, which object in SR setting 300 or physical setting 306 gesture input 320 is directed to. In the present example, gesture processing module 227 determines from the image data that gesture input 320 is directed to virtual object 304. Based on this determination, the gesture event is indicated as being directed to virtual object 304. The gesture event further indicates the time at which the gesture input is detected.

Gesture processing module 227 detects and stores detected gesture events over time. For example, with reference to FIG. 4, timeline 400 includes gesture events 406 detected by gesture processing module 227 over time. Each gesture event occurs at a respective time (e.g., time at which the corresponding gesture input is detected) and is directed to a respective object. In this example, gesture event G1 corresponds to gesture input 320 and is directed to virtual object 304. Gesture event G2 corresponds to a different gesture input and is directed to physical object 308, for example. In some embodiments, parameter resolution module 236 (in conjunction with voice assistant client module 230) searches the gesture events stored in gesture processing module 227 and identifies one or more relevant gesture events for resolving an unresolved parameter. For instance, in the present example, parameter resolution module 236 can determine whether or not gesture events G1 and/or G2 are relevant for resolving the "object" parameter.

In some embodiments, the one or more relevant gesture events are identified using similar techniques as described above for identifying one or more relevant gaze events. The one or more relevant gesture events are identified, for example, based on comparing the time at which each gesture event occurred within time period 408 of speech input 402. In the present example, a second reference time is determined based on the time $T_0$ at which the ambiguous expression "this" is spoken in speech input 402. Specifically, the second reference time is determined by applying an offset C to $T_0$. Thus, the second reference time is $(T_0-C)$. Shifting the second reference time earlier than time $T_0$ can be appropriate for gesture events because gesture references (e.g., pointing or selecting an object) are more likely to occur prior to spoken references (e.g., "this"). Time period 418 is then defined based on the second reference time (e.g., using one or more predefined rules). For example, similar to time period 416, time period 418 is defined as beginning at a predefined second time interval before the second reference time and ending at the predefined second time interval after the second reference time. In the present example, gesture event G1 (and not gesture event G2) is determined to occur at least partially within time period 418. Based on this determination, parameter resolution module 238 identifies gesture event G1 (and not gesture event G2) as being relevant for resolving the "object" parameter. Parameter resolution module 238 then uses gesture event G1 to resolve the "object" parameter. For example, based on gesture event G1 being directed to virtual object 304, parameter resolution module 238 determines that the "object" parameter corresponds to virtual object 304. Specifically, parameter resolution module 238 determines a parameter value (e.g., the object identifier for virtual object 304) for the "object" parameter of the "close application" sub-domain.

Although in the examples described above, relevant gaze events and gesture events are used to further resolve one or more parameters of a selected domain after initially attempting to resolve the parameter using attribute tags of objects in the SR setting, it should be recognized that contextual information can be applied in any order to resolve the one or more parameters. For example, after determining that the domain corresponding to the speech input "close this" is the "close application" sub-domain, parameter resolution module 238 can initially utilize relevant gaze events to attempt to resolve the "object" parameter of the "close application" sub-domain. If, based on the identified relevant gaze events, more than one possible object in SR setting 300 is identified as corresponding to the "object" parameter, other contextual information can be used to further resolve the "object" parameter. For example, the attribute tags of objects in SR setting 300 and/or relevant gesture events can be used to further narrowing the more the one possible object to a single object.

It should further be appreciated that other contextual information can be used to resolve one or more parameters of the domain. For example, previous user input (e.g., speech input, gesture input, etc.) associated with previously displayed SR settings can be used to resolve one or more parameters of the domain.

Moreover, it should be recognized that, in some embodiments, the contextual information described above (e.g., attribute tags of objects, gaze events, and/or gesture events) can be used (e.g., by natural language understanding module 236) to determine the domain corresponding to the text representation of the speech input. For example, the contextual information can be utilized to identify relevant semantic concepts with respect to the SR setting and determine a domain corresponding to those identified relevant semantic concepts.

Upon resolving the "object" parameter of the "close application" domain, natural language understanding module 236 determines that the user intent for the speech input is to close the graphical user interface of the email application (e.g., virtual object 304). Based on a representation of the determined user intent obtained from natural language understanding module 236, task processing module determines a set of tasks representing the user intent of closing the graphical user interface of the email application. The set of tasks is, for example, a set of programmed instructions for system 200 to perform the action of closing the graphical user interface of the email application. The set of tasks is determined from the parameter value (e.g., the object identifier of virtual object 304) for the "object" parameter. For example, the set of programmed instructions specifies the object identifier of virtual object 304 as the graphical user interface to close.

Task processing module 240 causes one or more components of system 200 to executing the determined set of tasks. In some examples, task processing module 240 causes server system 206 to execute a portion of the set of tasks and causes first device 202 and/or second device 204 to execute the remaining portion of the set of tasks. In the present example, task processing module 240 sends at least a portion of the set of tasks to first device 202 for execution. Executing the at least portion of the set of tasks by first device 202 includes, for example, causing the email application 226 to change states (e.g., close the graphical user interface of the email application) and causing reality engine 218 to update the SR setting. For example, with reference to FIG. 3C, reality engine 218 generates updated SR setting 322 that omits virtual object 304 and causes updated SR setting 322 to display on display(s) 212.

Figure 5:
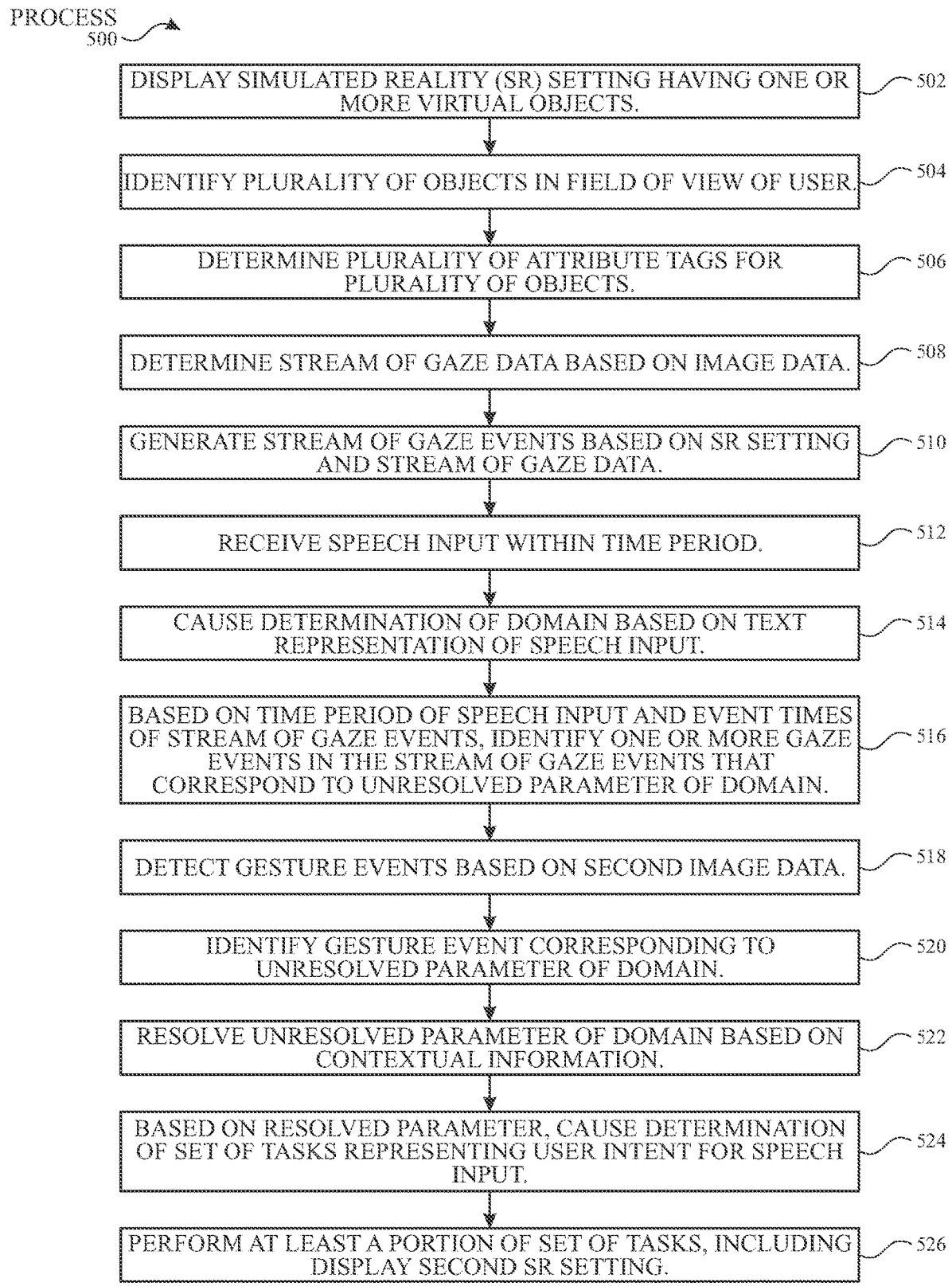
FIG. 5 depicts a flow chart of an exemplary process for resolving natural language parameters with respect to a simulated reality setting.

Turning now to FIG. 5, a flow chart of process 500 for resolving natural language parameters with respect to an SR setting is depicted, in accordance with some embodiments. Process 500 is performed by an electronic system (e.g., system 100 or 200). In some embodiments, process 500 is perform using one or more user devices. For example, process is performed using a standalone user device (e.g., device 100a). Alternatively, the blocks of process 500 are divided up in any manner between two or more user devices (e.g., devices 100b and 100c). In some embodiments, process 500 is performed using one or more client devices (e.g., devices 202 and 204) and a server system (e.g., 206). In these embodiments, the blocks of process 500 are divided up in any manner between the client device(s) and the server. Although the blocks of process 500 are depicted in a particular order in FIG. 5, it should be appreciated that these blocks can be performed in any order. Further, one or more blocks of process 500 can be optional and/or additional blocks can be performed.

At block 502, an SR setting (e.g., SR setting 300) having one or more virtual objects (e.g., virtual objects 302 and 304) is displayed on a display (e.g., display(s) 212). In some embodiments, the SR setting is generated (e.g., using reality engine 218) based on sensor data obtained from various sensors (e.g., image sensors 214a-b, location sensor(s) 116, and orientation sensor(s) 110). In some embodiments, the one or more virtual objects include a graphical user interface (e.g., virtual object 302 or 304) for an application (e.g., applications 226) running on the electronic system.

At block 504, a plurality of objects in a field of view of a user is identified (e.g., using reality engine 218 and/or computer vision module 220). For example, each of the objects in the displayed SR setting are identified and tracked. The plurality of objects includes the one or more virtual objects of the SR setting. In some embodiments, the plurality of objects includes one or more physical objects (e.g., physical objects 308-318) of a physical setting (e.g., physical setting 306) within the field of view of the user. In some embodiments, the physical objects are identified based on image data of a physical setting. For example, image data of the physical setting is obtained from one or more second images sensors (e.g., second image sensors 214b) that are directed toward the physical setting. The obtained image data of the physical setting is analyzed using pattern recognition techniques to identify the one or more physical objects.

At block 506, a plurality of attribute tags is determined (e.g., using reality engine 218 and/or computer vision module 220) for the plurality of objects. Each attribute tag of the plurality of attribute tags specifies one or more attributes of a respective object of the plurality of objects. In embodiments where the plurality of objects includes one or more physical objects, the plurality of attribute tags include attributes tags determined for the one or more physical objects based on image data from the one or more second image sensors.

At block 508, based on image data obtained from one or more first image sensors (e.g., first image sensors 214a), a stream of gaze data is determined (e.g., using gaze tracker 222) with respect to the SR setting. The stream of gaze data includes various information, such as gaze direction and gaze fixation position, representing where the user is gazing with respect to SR setting at any given time.

At block 510, based on the displayed SR setting and the determined stream of gaze data, a stream of gaze events (e.g., gaze events 404) are generated (e.g., using gaze event generator 224). The stream of gaze events correspond to a plurality of event times and a plurality of gazed objects. For example, each gaze event in the stream of gaze events occurs at a respective event time of the plurality of event times and represents user gaze fixation on a respective gazed object of the plurality of gazed objects. In some embodiments, the plurality of gazed objects is a subset of the plurality of objects identified at block 504. In some embodiments, the plurality of gazed objects includes the one or more virtual objects in the SR setting. In some embodiments, the plurality of gazed objects includes one or more physical objects of a physical setting.

In some embodiments, generating the stream of gaze events includes determining respective durations of gaze fixations on the plurality of gazed objects. Each gaze event includes, for example, the determined duration at which the user's gaze continuously fixates on the respective gazed object. In some embodiments, each gaze event in the stream of gaze events is identified from the stream of gaze data based on a determination that a duration of the user gaze fixation on the respective gazed object satisfies a threshold duration.

At block 512, speech input (e.g., speech input 402) is received (e.g., by voice assistant client module 230 via microphone 216 and connection 208) within a time period (e.g., time period 408). In some examples, the speech input is received in the form of audio data. The speech input represents, for example, a spoken request for a voice assistant of the electronic system to perform one or more tasks. In some examples, the speech input includes an ambiguous expression (e.g., a deictic expression).

At block 514, process 500 causes determination of a domain (e.g., a natural language domain or a domain of an ontology) based on a text representation of the speech input. For example, the text representation of the speech input is determined (e.g., using speech recognition module 234). In some examples, the text representation includes a deictic expression (e.g., "this," "that," "here," etc.) Based on the text representation, the domain corresponding to the speech input is selected (e.g., using natural language understanding module 236) from a plurality of predefined domains.

At block 516, based on the time period of the speech input and the plurality of event times corresponding to the stream of gaze events, one or more gaze events in the stream of gaze events are identified (e.g., by voice assistant client module 230 and/or parameter resolution module 238). The identified one or more gaze events correspond to an unresolved parameter of the domain. In some embodiments, block 516 includes searching the stream of gaze events to identified the one or more gaze events that are relevant to resolving the unresolved parameter of the domain. In some embodiments, block 516 is performed in response to determining that a parameter of the domain is unable to be unresolved.

In some embodiments, the one or more gaze events are identified based on analyzing a semantic relationship between the domain and each of the plurality of attribute tags for the plurality of objects (blocks 504 and 506). For example, each gaze event identified at block 516 corresponds to a respective object having attribute tags that are determined to be semantically related to the domain.

In some embodiments, the one or more gaze events are identified based on the respective durations of gaze fixations on the plurality of gazed objects. For example, each gaze event identified at block 516 has a duration of gaze fixation (e.g., on a respective gazed object) that satisfies a threshold condition (e.g., greater or equal to a threshold duration).

In some embodiments, the one or more gaze events are identified based on temporal proximity to the time period of the speech input. For example, based on the plurality of time events for the stream of gaze events, a determination is made that the one or more gaze events occur closest to the time period relative to other gazed events in the stream of gaze events. The one or more gaze events are thus identified based on this determination. In some embodiments, the one or more gaze events are identified based on the one or more gaze events occurring at least partially within the time period of the speech input.

In some embodiments, the one or more gaze events are determined based on a reference time at which an ambiguous expression in the speech input was spoken. In these embodiments, block 516 includes determining that the ambiguous expression corresponds to the unresolved parameter and determined the reference time at which the ambiguous expression was spoken. The one or more gaze events are identified based on a determination that the one or more gaze events each occurred within a threshold time interval from the reference time.

In some embodiments, the one or more gaze events are determined based on the time interval between consecutive gaze events in the stream of gaze events. For example, the one or more gaze events include a first gaze event and a second gaze event. The first gaze event and the second gaze event are consecutive events in the stream of gaze events. In this example, the one or more gaze events are identified based on a determination that a time interval separating the first gaze event and the second gaze satisfies a threshold condition (e.g., less than or equal to a threshold time interval).

In some embodiments, the one or more gaze events are determined using a machine-learned model. The machine-learned model is, for example, configured to receive the text representation and the stream of gaze events as input and to output a probability distribution across the stream of gaze events. The probability distribution represents a likelihood that a given gaze event in the stream of gaze events corresponds to the unresolved parameter. In some embodiments, the machine-learned model is further configured to receive, as input, time information for each gaze event in the stream of gaze events.

At block 518, one or more gesture events (e.g., gesture events 406) are detected (e.g., using gesture processing module 227) based on second image data. For example, the second image data is obtained from one or more second image sensors (e.g., second image sensors 214b). The second image data includes a representation of one or more gesture inputs by the user. Based on the obtained second image data, the one or more gesture events corresponding to the one or more gesture inputs are detected. Detecting the one or more gesture events includes, for example, identifying one or more objects in the SR setting to which the one or more gesture events is directed. In some embodiments, block 516 includes storing the one or more gesture events. Each gesture event is stored with information indicating the one or more objects (e.g., virtual or physical objects) that the gesture event is directed to and the time at which the gesture event occurred.

At block 520, a gesture event corresponding to the unresolved parameter of the domain is identified (e.g., using gesture processing module 227, voice assistant client module 230, and/or parameter resolution module 238) from the one or more detected gesture events. For example, the gesture event is identified as being relevant for resolving the unresolved parameter of the domain. The gesture event is identified from the one or more detected gesture events in a similar manner as the one or more gaze events are identified from the stream of gaze events in block 516. For example, the gesture event is identified based on the times at which each detected gesture event occurred and the time period of the speech input.

At block 522, the unresolved parameter of the domain is resolved (e.g., using voice assistant client module 230 and/or parameter resolution module 238) based on contextual information. The contextual information includes, for example, the plurality of attribute tags for the plurality of objects (determined at block 506), the one or more gaze events (identified at block 516), the gesture event (identified at block 520), or any combination thereof.

In some embodiments, based on the plurality of attribute tags and the domain, at least two objects corresponding to the unresolved parameter of the domain are identified from the plurality of objects. In particular, the at least two objects are determined to be semantically related to the domain. In these examples, the unresolved parameter is at least partially resolved using the attribute tags of the identified at least two objects. In some examples, a parameter value for the unresolved parameter of the domain is determined based on the identified at least two objects.

In some embodiments, the unresolved parameter is at least partially resolved using the identified one or more gaze events of block 516. In some examples, a parameter value for the unresolved parameter of the domain is determined based on the identified one or more gaze events. For example, the identified one or more gaze events include a third gaze event corresponding to the graphical user interface of the application. The graphical user interface is a virtual object in the SR setting. In this example, the parameter value for the unresolved parameter is determined to include an identifier for the graphical user interface.

In some embodiments, the identified one or more gaze events are used to select an object from the at least two objects identified using the plurality of attribute tags. For example, an object is selected from the at least two objects by correlating the identified one or more gaze events to one of the at least two objects (e.g., the selected object). In this example, the parameter value is determined further based on one or more respective attribute tags of the selected object.

In some embodiments, the unresolved parameter is at least partially resolved using the identified gesture event of block 520. For example, the one or more objects to which the gesture event is directed is used to resolve the unresolved parameter. In this example, the parameter value for the unresolved parameter is determined based on the one or more objects to which the gesture event is directed.

At block 524, process 500 causes determination (e.g., using voice assistant client module 230 and/or task processing module 240) of a set of tasks representing a user intent for the speech input. For example, the user intent for the speech input is determined (e.g., using natural language understanding module 236) from the domain and the resolved parameter (e.g., the parameter value for the resolved parameter of block 522). The set of tasks is determined from the determined user intent. In some embodiments, the set of tasks is determined based on the parameter value for the resolved parameter. In some embodiments, the set of tasks includes instructions to close the graphical user interface (e.g., using applications 226) of the application and to generate (e.g., using reality engine 218) a second SR setting that does not include the graphical user interface for the application.

At block 526, at least a portion of the set of tasks is performed (e.g., using voice assistance client module 230, task processing module 240, and/or display(s) 212). In some embodiments, performing the at least a portion of the set of tasks includes generating and displaying the second SR setting on the display. The second SR setting does not include the graphical user interface for the application.

Aspects of the techniques described above contemplate the possibility of gathering and using personal information to resolve natural language ambiguities with respect to an SR setting. Such information should be collected with the user's informed consent.

Entities handling such personal information will comply with well-established privacy practices and/or privacy policies (e.g., that are certified by a third-party) that are (1) generally recognized as meeting or exceeding industry or governmental requirements, (2) user-accessible, (3) updated as needed, and (4) compliant with applicable laws. Entities handling such personal information will use the information for reasonable and legitimate uses, without sharing or selling outside of those legitimate uses.

However, users may selectively restrict access/use of personal information. For example, users can opt into or out of collection of their personal information. In addition, although aspects of the techniques described above contemplate use of personal information, aspects of the techniques can be implemented without requiring or using personal information. For example, if location information, usernames, and/or addresses are gathered, they can be generalized and/or masked so that they do not uniquely identify an individual.

What is claimed is:

1. A non-transitory computer-readable storage medium storing one or more programs configured to be executed by one or more processors of an electronic system with a display and one or more images sensors, the one or more programs including instructions for:
    displaying, on the display, a simulated reality setting;
    based on image data from the one or more image sensors, determining a stream of gaze data with respect to the simulated reality setting;
    based on the displayed simulated reality setting and the determined stream of gaze data, generating a stream of gaze events corresponding to a plurality of event times;
    receiving speech input within a time period;
    causing determination of a domain based on a text representation of the speech input;
    based on the time period and the plurality of event times, identifying one or more gaze events in the stream of gaze events that correspond to an unresolved parameter of the domain;
    causing determination of a set of tasks representing a user intent for the speech input, wherein a parameter value is determined for the unresolved parameter based on the identified one or more gaze events, and wherein the set of tasks is determined based on the parameter value; and
    performing at least a portion of the set of tasks.

2. The non-transitory computer-readable storage medium of claim 1, wherein the text representation includes a deictic expression, and wherein the unresolved parameter corresponds to the deictic expression.

3. The non-transitory computer-readable storage medium of claim 1, wherein each gaze event in the stream of gaze events occurs at a respective event time of the plurality of event times and represents user gaze fixation on a respective gazed object of the plurality of gazed objects.

4. The non-transitory computer-readable storage medium of claim 3, wherein each gaze event in the stream of gaze events is identified from the stream of gaze data based on a determination that a duration of the user gaze fixation on the respective gazed object satisfies a threshold duration.

5. The non-transitory computer-readable storage medium claim 1, the one or more programs further including instructions for:
    identifying a plurality of objects in a field of view of a user, wherein the plurality of gazed objects is a subset of the plurality of objects;
    determining a plurality of attribute tags for the plurality of objects, wherein each attribute tag of the plurality of attribute tags specifies an attribute of a respective object of the plurality of objects; and
    based on the plurality of attribute tags and the domain, identifying, from the plurality of objects, at least two objects that correspond to the unresolved parameter of the domain, wherein an object is selected from the at least two objects by correlating the identified one or more gaze events to the selected object, and wherein the parameter value is determined further based on one or more respective attribute tags of the selected object.

6. The non-transitory computer-readable storage medium of claim 1, wherein generating the stream of gaze events includes determining respective durations of gaze fixations on the plurality of gazed objects, and wherein the one or more gaze events are identified based on the respective durations of gaze fixations on the plurality of gazed objects.

7. The non-transitory computer-readable storage medium of claim 1, wherein the one or more gaze events are identified based on a determination, from the plurality of time events, that the one or more gaze events occurred closest to the time period relative to other gazed events in the stream of gaze events.

8. The non-transitory computer-readable storage medium of claim 1, wherein the speech input includes an ambiguous expression corresponding to the unresolved parameter, and further comprising:
    determining a reference time at which the ambiguous expression was spoken, wherein the one or more gaze events are identified based on a determination that the one or more gaze events each occurred within a threshold time interval from the reference time.

9. The non-transitory computer-readable storage medium of claim 1, wherein the one or more gaze events include a first gaze event and a second gaze event, and wherein the one or more gaze events are identified based on a determination that a time interval separating the first gaze event and the second gaze satisfies a threshold condition.

10. The non-transitory computer-readable storage medium of claim 1, the one or more programs further including instructions for:
    detecting a gesture event based on second image data from one or more second image sensors of the electronic system; and
    identifying one or more objects to which the gesture event is directed, wherein the one or more objects are identified within a field of view of a user, and wherein the parameter value is further determined based on the identified one or more objects.

11. The non-transitory computer-readable storage medium of claim 1, wherein the gesture event is detected at a second time, the one or more programs further including instructions for:
    determining, based on the second time and the time period, whether the gesture event is relevant to the unresolved parameter, wherein the parameter value is further determined based on the identified one or more objects in accordance with a determination that the gesture event is relevant to the unresolved parameter.

12. The non-transitory computer-readable storage medium of claim 1, wherein the one or more virtual objects include a graphical user interface for an application running on the electronic system, wherein the identified one or more gaze events include a third gaze event corresponding to the graphical user interface, and wherein the parameter value is determined to include an identifier for the graphical user interface.

13. The non-transitory computer-readable storage medium of claim 12, wherein the set of tasks includes instructions to close the graphical user interface for the application, and wherein the second simulated reality setting does not include the graphical user interface for the application.

14. The non-transitory computer-readable storage medium of claim 1, wherein the plurality of gazed objects further includes one or more physical objects of a physical setting.

15. The non-transitory computer-readable storage medium of claim 1, the one or more programs further including instructions for:
    based on second image data from one or more second image sensors of the electronic system, determining a plurality of attribute tags for the one or more physical objects, wherein the one or more gaze events are identified based on analyzing a semantic relationship between the domain and each of the plurality of attribute tags.

16. The non-transitory computer-readable storage medium of claim 15, wherein the parameter value is determined from at least one of the plurality of attribute tags.

17. The non-transitory computer-readable storage medium of claim 1, wherein the one or more gaze events are determined using a machine-learned model, wherein the machine-learned model is configured to receive the text representation and the stream of gaze events as an input and to output a probability distribution across the stream of gaze events, and wherein the probability distribution represents a likelihood that a given gaze event in the stream of gaze events correspond to the unresolved parameter.

18. The non-transitory computer-readable storage medium of claim 1, wherein the simulated reality setting has one or more virtual objects.

19. The non-transitory computer-readable storage medium of claim 18, wherein the one or more programs further including instructions for:
    generating a plurality of gazed objects, wherein the plurality of gazed objects includes the one or more virtual objects.

20. The non-transitory computer-readable storage medium of claim 1, wherein performing at least a portion of the set of tasks includes displaying a second simulated reality setting on the display.

21. An electronic system, comprising:
a display;
one or more images sensors;
one or more processors; and
memory storing one or more programs configured to be executed by the one or more processors, the one or more programs including instructions for:
  displaying, on the display, a simulated reality setting;
  based on image data from the one or more image sensors, determining a stream of gaze data with respect to the simulated reality setting;
  based on the displayed simulated reality setting and the determined stream of gaze data, generating a stream of gaze events corresponding to a plurality of event times;
  receiving speech input within a time period;
  causing determination of a domain based on a text representation of the speech input;
  based on the time period and the plurality of event times, identifying one or more gaze events in the stream of gaze events that correspond to an unresolved parameter of the domain;
  causing determination of a set of tasks representing a user intent for the speech input, wherein a parameter value is determined for the unresolved parameter based on the identified one or more gaze events, and wherein the set of tasks is determined based on the parameter value; and
  performing at least a portion of the set of tasks.

22. The electronic system of claim 21, wherein the text representation includes a deictic expression, and wherein the unresolved parameter corresponds to the deictic expression.

23. The electronic system of claim 22, wherein each gaze event in the stream of gaze events is identified from the stream of gaze data based on a determination that a duration of the user gaze fixation on the respective gazed object satisfies a threshold duration.

24. The electronic system of claim 21, wherein each gaze event in the stream of gaze events occurs at a respective event time of the plurality of event times and represents user gaze fixation on a respective gazed object of the plurality of gazed objects.

25. The electronic system of claim 21, the one or more programs further including instructions for:
  identifying a plurality of objects in a field of view of a user, wherein the plurality of gazed objects is a subset of the plurality of objects;
  determining a plurality of attribute tags for the plurality of objects, wherein each attribute tag of the plurality of attribute tags specifies an attribute of a respective object of the plurality of objects; and
  based on the plurality of attribute tags and the domain, identifying, from the plurality of objects, at least two objects that correspond to the unresolved parameter of the domain, wherein an object is selected from the at least two objects by correlating the identified one or more gaze events to the selected object, and wherein the parameter value is determined further based on one or more respective attribute tags of the selected object.

26. The electronic system of claim 21, wherein generating the stream of gaze events includes determining respective durations of gaze fixations on the plurality of gazed objects, and wherein the one or more gaze events are identified based on the respective durations of gaze fixations on the plurality of gazed objects.

27. The electronic system of claim 21, wherein the one or more gaze events are identified based on a determination, from the plurality of time events, that the one or more gaze events occurred closest to the time period relative to other gazed events in the stream of gaze events.

28. The electronic system of claim 21, wherein the speech input includes an ambiguous expression corresponding to the unresolved parameter, further comprising:
  determining a reference time at which the ambiguous expression was spoken, wherein the one or more gaze events are identified based on a determination that the one or more gaze events each occurred within a threshold time interval from the reference time.

29. The electronic system of claim 21, wherein the one or more gaze events include a first gaze event and a second gaze event, and wherein the one or more gaze events are identified based on a determination that a time interval separating the first gaze event and the second gaze satisfies a threshold condition.

30. The electronic system of claim 21, the one or more programs further including instructions for:
  detecting a gesture event based on second image data from one or more second image sensors of the electronic system; and
  identifying one or more objects to which the gesture event is directed, wherein the one or more objects are identified within a field of view of a user, and wherein the parameter value is further determined based on the identified one or more objects.

31. The electronic system of claim 21, wherein the gesture event is detected at a second time, the one or more programs further including instructions for:
  determining, based on the second time and the time period, whether the gesture event is relevant to the unresolved parameter, wherein the parameter value is further determined based on the identified one or more objects in accordance with a determination that the gesture event is relevant to the unresolved parameter.

32. The electronic system of claim 31, wherein the set of tasks includes instructions to close the graphical user interface for the application, and wherein the second simulated reality setting does not include the graphical user interface for the application.

33. The electronic system of claim 21, wherein the one or more virtual objects include a graphical user interface for an application running on the electronic system, wherein the identified one or more gaze events include a third gaze event corresponding to the graphical user interface, and wherein the parameter value is determined to include an identifier for the graphical user interface.

34. The electronic system of claim 21, wherein the plurality of gazed objects further includes one or more physical objects of a physical setting.

35. The electronic system of claim 34, wherein the parameter value is determined from at least one of the plurality of attribute tags.

36. The electronic system of claim 21, the one or more programs further including instructions for:
  based on second image data from one or more second image sensors of the electronic system, determining a plurality of attribute tags for the one or more physical objects, wherein the one or more gaze events are identified based on analyzing a semantic relationship between the domain and each of the plurality of attribute tags.

37. The electronic system of claim 21, wherein the one or more gaze events are determined using a machine-learned model, wherein the machine-learned model is configured to receive the text representation and the stream of gaze events as an input and to output a probability distribution across the stream of gaze events, and wherein the probability distribution represents a likelihood that a given gaze event in the stream of gaze events correspond to the unresolved parameter.

38. The electronic system of claim 21, wherein the simulated reality setting has one or more virtual objects.

39. The electronic system of claim 38, wherein the one or more programs further including instructions for:
generating a plurality of gazed objects, wherein the plurality of gazed objects includes the one or more virtual objects.

40. The electronic system of claim 21, wherein performing at least a portion of the set of tasks includes displaying a second simulated reality setting on the display.

41. A method, performed by an electronic system having one or more processors, memory, a display, and one or more image sensors, the method comprising:
displaying, on the display, a simulated reality setting;
based on image data from the one or more image sensors, determining a stream of gaze data with respect to the simulated reality setting;
based on the displayed simulated reality setting and the determined stream of gaze data, generating a stream of gaze events corresponding to a plurality of event times;
receiving speech input within a time period;
causing determination of a domain based on a text representation of the speech input;
based on the time period and the plurality of event times, identifying one or more gaze events in the stream of gaze events that correspond to an unresolved parameter of the domain;
causing determination of a set of tasks representing a user intent for the speech input, wherein a parameter value is determined for the unresolved parameter based on the identified one or more gaze events, and wherein the set of tasks is determined based on the parameter value; and
performing at least a portion of the set of tasks.

42. The method of claim 41, wherein the text representation includes a deictic expression, and wherein the unresolved parameter corresponds to the deictic expression.

43. The method of claim 42, wherein each gaze event in the stream of gaze events is identified from the stream of gaze data based on a determination that a duration of the user gaze fixation on the respective gazed object satisfies a threshold duration.

44. The method of claim 41, wherein each gaze event in the stream of gaze events occurs at a respective event time of the plurality of event times and represents user gaze fixation on a respective gazed object of the plurality of gazed objects.

45. The method of claim 41, further comprising:
identifying a plurality of objects in a field of view of a user, wherein the plurality of gazed objects is a subset of the plurality of objects;
determining a plurality of attribute tags for the plurality of objects, wherein each attribute tag of the plurality of attribute tags specifies an attribute of a respective object of the plurality of objects; and
based on the plurality of attribute tags and the domain, identifying, from the plurality of objects, at least two objects that correspond to the unresolved parameter of the domain, wherein an object is selected from the at least two objects by correlating the identified one or more gaze events to the selected object, and wherein the parameter value is determined further based on one or more respective attribute tags of the selected object.

46. The method of claim 41, wherein generating the stream of gaze events includes determining respective durations of gaze fixations on the plurality of gazed objects, and wherein the one or more gaze events are identified based on the respective durations of gaze fixations on the plurality of gazed objects.

47. The method of claim 41, wherein the one or more gaze events are identified based on a determination, from the plurality of time events, that the one or more gaze events occurred closest to the time period relative to other gazed events in the stream of gaze events.

48. The method of claim 41, wherein the speech input includes an ambiguous expression corresponding to the unresolved parameter, and further comprising:
determining a reference time at which the ambiguous expression was spoken, wherein the one or more gaze events are identified based on a determination that the one or more gaze events each occurred within a threshold time interval from the reference time.

49. The method of claim 41, wherein the one or more gaze events include a first gaze event and a second gaze event, and wherein the one or more gaze events are identified based on a determination that a time interval separating the first gaze event and the second gaze satisfies a threshold condition.

50. The method of claim 41, further comprising:
detecting a gesture event based on second image data from one or more second image sensors of the electronic system; and
identifying one or more objects to which the gesture event is directed, wherein the one or more objects are identified within a field of view of a user, and wherein the parameter value is further determined based on the identified one or more objects.

51. The method of claim 41, wherein the gesture event is detected at a second time, and further comprising:
determining, based on the second time and the time period, whether the gesture event is relevant to the unresolved parameter, wherein the parameter value is further determined based on the identified one or more objects in accordance with a determination that the gesture event is relevant to the unresolved parameter.

52. The method of claim 51, wherein the set of tasks includes instructions to close the graphical user interface for the application, and wherein the second simulated reality setting does not include the graphical user interface for the application.

53. The method of claim 41, wherein the one or more virtual objects include a graphical user interface for an application running on the electronic system, wherein the identified one or more gaze events include a third gaze event corresponding to the graphical user interface, and wherein the parameter value is determined to include an identifier for the graphical user interface.

54. The method of claim 41, wherein the plurality of gazed objects further includes one or more physical objects of a physical setting.

55. The method of claim 54, wherein the parameter value is determined from at least one of the plurality of attribute tags.

56. The method of claim 41, further comprising:
based on second image data from one or more second image sensors of the electronic system, determining a plurality of attribute tags for the one or more physical objects, wherein the one or more gaze events are identified based on analyzing a semantic relationship between the domain and each of the plurality of attribute tags.

57. The method of claim 41, wherein the one or more gaze events are determined using a machine-learned model, wherein the machine-learned model is configured to receive the text representation and the stream of gaze events as an input and to output a probability distribution across the stream of gaze events, and wherein the probability distribution represents a likelihood that a given gaze event in the stream of gaze events correspond to the unresolved parameter.

58. The method of claim 41, wherein the simulated reality setting has one or more virtual objects.

59. The method of claim 58, wherein the one or more programs further including instructions for:
  generating a plurality of gazed objects, wherein the plurality of gazed objects includes the one or more virtual objects.

60. The method of claim 41, wherein performing at least a portion of the set of tasks includes displaying a second simulated reality setting on the display.

\* \* \* \* \*

UNITED STATES PATENT AND TRADEMARK OFFICE
CERTIFICATE OF CORRECTION

PATENT NO. : 11,507,183 B2
APPLICATION NO. : 17/022680
DATED : November 22, 2022
INVENTOR(S) : Niranjan Manjunath et al.

Page 1 of 1

It is certified that error appears in the above-identified patent and that said Letters Patent is hereby corrected as shown below:

In the Claims

Column 23, Line 15: In Claim 5, after "medium" insert -- of --.

Column 23, Line 47: In Claim 8, delete "and further comprising" and insert -- the one or more programs further including instructions for --, therefor.

Column 24, Line 5: In Claim 11, delete "claim 1," and insert -- claim 10, --, therefor.

Signed and Sealed this
Twelfth Day of September, 2023

Katherine Kelly Vidal
*Director of the United States Patent and Trademark Office*